United States Patent [19]

Shirono et al.

[11] 4,354,436
[45] Oct. 19, 1982

[54] STAND FOR SUPPORTING ITEMS OF ELECTRONIC EQUIPMENT

[75] Inventors: Junkichi Shirono; Katsuhisa Honda, both of Tokyo, Japan

[73] Assignee: Anritsu Electric Company Limited, Tokyo, Japan

[21] Appl. No.: 159,908

[22] Filed: Jun. 16, 1980

[30] Foreign Application Priority Data

Jun. 19, 1979 [JP] Japan .................................. 54-76362

[51] Int. Cl.³ .............................................. A47B 3/08
[52] U.S. Cl. .................... 108/123; 108/119; 248/129; 248/168
[58] Field of Search ............... 108/123, 118, 115, 119; 248/166, 168, 439, 129

[56] References Cited

U.S. PATENT DOCUMENTS

| | | | |
|---|---|---|---|
| 2,695,829 | 11/1954 | Martinez | 108/118 X |
| 2,723,817 | 11/1955 | Harwood et al. | 248/166 X |
| 2,874,003 | 2/1959 | Humphries | 108/115 X |
| 3,017,034 | 1/1962 | Klein | 108/109 X |
| 3,345,959 | 10/1967 | Linstead | 108/119 |

*Primary Examiner*—William E. Lyddane
*Attorney, Agent, or Firm*—Jordan and Hamburg

[57] ABSTRACT

A trolley for supporting and transporting units of electronic equipment is provided with a front pair of legs and a rear pair of legs, with horizontal members being integrally formed with each pair of legs. A platform is supported upon the horizontal member of the rear legs and upon a mount member rotatably mounted upon the horizontal member of the front pair of legs. Supporting brackets are fixed to each of the rear legs, upon which are attached retaining brackets, with the horizontal member of the front legs being retained within these retaining brackets in rotatable manner. Link members are rotatably coupled to the lower ends of the legs, in such a way that the entire assembly may be folded together into a very compact space. Greatly increased strength and rigidity by comparison with conventional trolleys is ensured.

14 Claims, 7 Drawing Figures

STAND FOR SUPPORTING ITEMS OF ELECTRONIC EQUIPMENT

BACKGROUND OF THE INVENTION

The present invention is directed toward an improved supporting stand for supporting items of electronic equipment. Such a stand is frequently used to support extremely expensive or delicate electronic units, and therefore should be as strong and sturdy as is practicable. However, it should preferably also be capable of being stored in a minimum amount of space when not actually required for use. As will be explained hereinafter, the above requirements are not fully met by electronic equipment of conventional type, which are subject to vibration when sideways acting forces are applied to them, and which cannot be folded up in such a way as to minimize the storage space necessary for them. The present invention is designed to overcome these disadvantages of prior art stands for electronic equipment units.

SUMMARY OF THE INVENTION

The present invention comprises a stand for supporting units of electronic equipment, which is strong and rigid when set into a supporting configuration, and which occupies a minimum of space when folded. It comprises two front legs and two rear legs, each pair of legs having an upper horizontal member integrally attached between the upper ends, and with mount members rotatably provided on one of the horizontal members. A supporting platform is attached to the mount members, and is supported thereby. A link mechanism is provided at the lower ends of the legs, to enable the stand to be folded when not actually required for use. Casters may be mounted on the lower ends of the legs, so that the stand may be movable.

DESCRIPTION OF THE PREFERRED EMBODIMENT

In the following description and in the accompanying claims, the term "stand" is utilized to refer to both a device for supporting a unit of electronic equipment in a stationary position and to device which is equipped with casters so as to be movable, for transporting or shifting the position of electronic equipment units when required. This is done in order to avoid ambiguity, and despite the fact that such a movable stand is sometimes referred to as a "trolley".

Figure 1A:
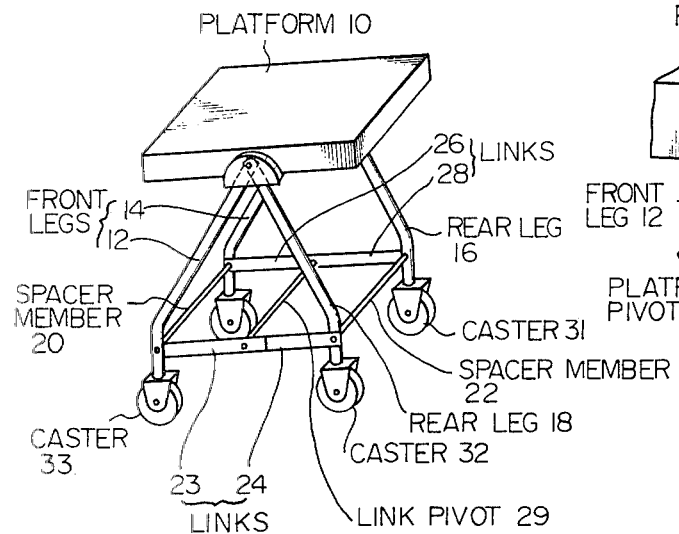
FIG. 1A is a diagram showing a typical stand of conventional type for supporting and transporting electronic equipment units.
Figure 1B:
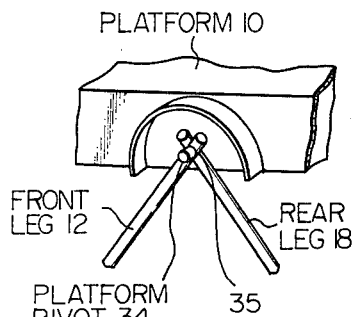
FIG. 1B is a detail diagram of a pivot portion in the stand of FIG. 1A.

Before describing an embodiment of the present invention, a typical type of movable stand, of conventional form, will be discussed. Such a stand is illustrated in FIG. 1A. An upper platform 10 may be fixed either in the horizontal plane or at some suitable angle, to support a unit of electronic equipment thereupon. The platform 10 is supported upon a pair of front legs, 12 and 14, and a pair of rear legs, 16 and 18. Spacer members 20 and 22, consisting of rigid rods, are coupled at each end between the front legs 12 and 14 and between the rear legs 16 and 18, respectively. These spacer members 20 and 22 act to retain the lower ends of the front and rear pairs of legs with a fixed spacing between the legs in each pair. Link members 23 and 24 are each rotatably mounted at one end to legs 12 and 18 respectively and are rotatably coupled at the other end of each by means of a link pivot 30. Similarly, link members 26 and 28 are each rotatably mounted at one end to legs 14 and 16 and are rotatably coupled at the other end of each by means of link pivot 29. The upper ends of front leg 12 and rear leg 18 are rotatably coupled by means of a platform pivot 34, as is shown in the detail diagram of FIG. 1B. Platform pivot 34 is fixedly attached to platform 10. The upper ends of front leg 14 and rear leg 16 are similarly coupled by means of a platform pivot, not shown in the drawings.

The lower ends of each of legs 14, 16, 18 and 12 are each provided with a caster 30, 31, 32 and 33 respectively, in this example, so that the stand is movable.

Figure 1C:
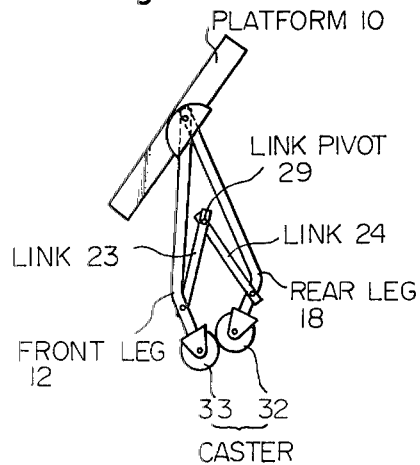
FIG. 1C is a side view illustrating the appearance of the stand of FIG. 1A when folded.
Figure 1D:
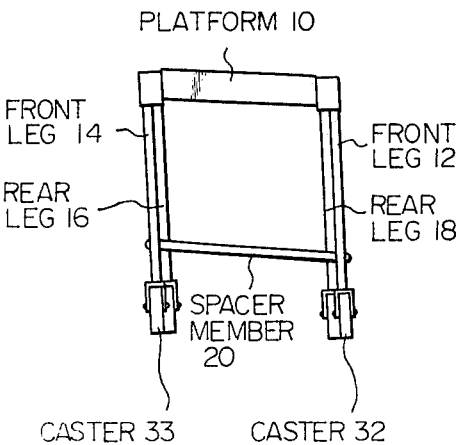
FIG. 1D is a diagram to illustrate the effects of a sideways acting force upon the conventional type of stand of FIG. 1A.

The configuration of this movable stand when folded for storage is shown in FIG. 1C. Here, since the spacing between front legs 12 and 14 and the spacing between rear legs 16 and 18 are almost identical, the casters 32 and 33 come into contact when the legs are folded, so that it is not possible to reduce the size of the stand, when folded, to the minimum possible. In order to prevent this effect, it might be attempted to increase the spacing between front legs 12 and 14 over that between rear legs 16 and 18. However this would necessitate an increase in the length of platform pivot 34. In order to maintain the strength of this pivot (and that of the other platform pivot, not shown), it would be necessary to increase the diameter of platform pivot 34. This in turn would increase the diameter of the hole 35 which is required in each of legs 12 and 18 in order to accommodate platform pivot 34, thereby weakening the legs. FIG. 1D illustrates the effect of application of a sideways-acting force upon such a stand when the strength of the coupling between the upper ends of the legs and the platform pivots is insufficient. As shown, application of such a force results in sideways flexing of the stand, so that the structure is insufficiently rigid and stable.

From the above, it can be seen that there are basic disadvantages in such a conventional type of stand, whereby the requirements for a minimum of space being occupied by the stand when folded are incompatible with the requirement for maximum strength and rigidity of the stand when being used to support equipment.

Figure 2A:
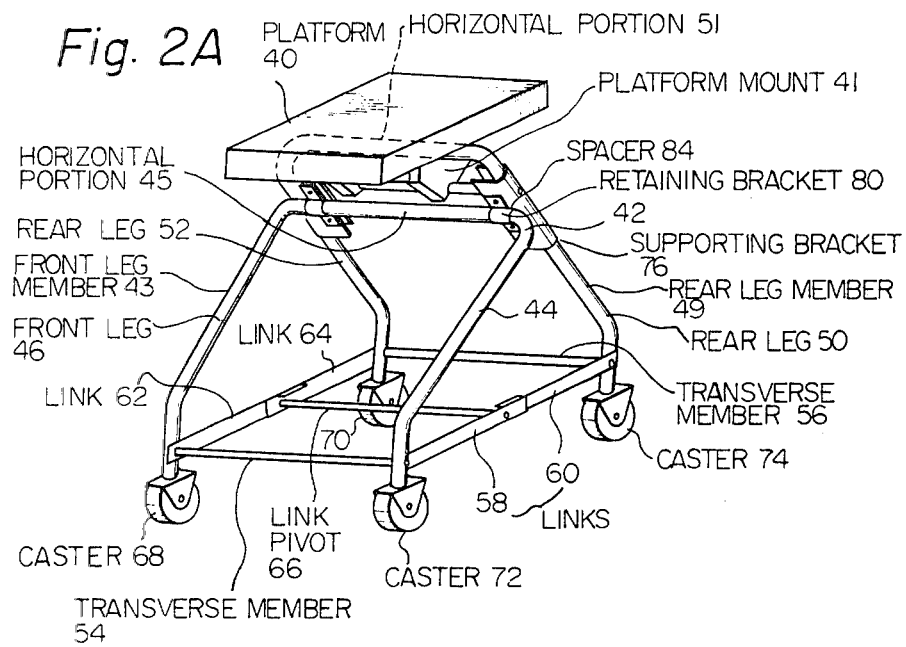
FIG. 2A is a diagram illustrating an embodiment of an equipment stand according to the present invention.

Referring now to FIG. 2A, an embodiment of a stand for supporting electronic equipment according to the present invention is shown. Numeral 43 denotes a front leg member, which comprises front legs 44 and 46 which are integrally formed with a horizontal portion 45. Numeral 49 denotes a rear leg member, which comprises rear legs 50 and 52 which are integrally formed with a horizontal portion 51. A transverse member 54 is fixedly attached at each end thereof to the lower ends of front legs 44 and 46, to hold these legs at a predetermined distance apart, while a transverse member 56 is similarly attached between the lower ends of the rear legs 50 and 52. In this embodiment of the present invention, casters 68, 70, 72 and 74 are fixedly attached at the lower ends of legs 46, 52, 44 and 50, in order to provide a movable equipment stand. It is a feature of the present invention that the spacing between the front legs 44 and 46 is greater than the spacing between the rear legs 50 and 52 by an amount which is greater than the width of a caster. Link members 58 and 60 are rotatably mounted at one end of each to transverse members 54 and 56 respectively, while link members 62 and 64 are similarly rotatably mounted at one end to transverse members 54 and 56 respectively. The other ends of link members 58 and 60 are rotatably coupled by means of a link pivot 66, while the other ends of link members 62 and 64 are similarly coupled together by link pivot 66.

A platform 40 for supporting electronic equipment is supported by means of platform mounts, one of which is shown in FIG. 2A, as denoted by reference numeral 41. These platform mounts are attached to the platform 40 in a fixed manner in this embodiment, and are supported on horizontal portion 51 of rear leg member 49 in such a way as to be either rotatable about this horizontal portion 51 or to be held fixed with respect to horizontal portion 51, by means of some suitable mechanical arrangement.

Figure 2B:
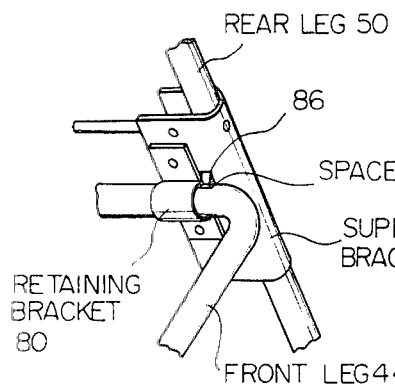
FIG. 2B is a detail diagram of a rotatable joint portion of the embodiment of FIG. 2A.

Means are provided whereby the front leg member 43 is rotatable coupled by its horizontal portion 45 to rear leg member 49. These means comprise supporting brackets, one of which is shown in the drawings as denoted by numeral 76, and corresponding retaining brackets, one of which is denoted by numeral 80. FIG. 2B is a detail illustration of the maner in which these brackets are arranged. As shown, supporting bracket 76 is fixedly attached to rear leg 50, while retaining bracket 80 is fixedly attached to supporting bracket 76, with the horizontal portion 45 of front leg member 43 being rotatably held between retaining bracket 80 and supporting bracket 76. To facilitate rotational movement between the front and rear leg members, a spacer 84 made of a suitable material such as a plastic material is provided in a recess 86 within supporting bracket 76, and is contoured to match the outer shape of front leg member 43. A bracket assembly similar to that of FIG. 2B is provided at the other end of horizontal portion 45.

Figure 2C:
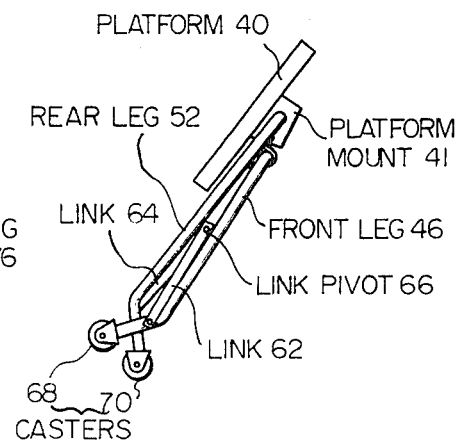
FIG. 2C is a side view illustrating the appearance of the stand of FIG. 2A when in a folded configuration.

It can be appreciated that with this arrangement, the spacing between front legs 44 and 46 can be increased significantly with respect to that between the rear legs 50 and 52, without significant loss of rigidity of the construction. This is due to the fact that it is not necessary to provide holes within the legs in order to rotatably couple together the front and rear legs, as in the case of an equipment stand of conventional type. As a result, since each of front and rear leg members 43 and 49 can be formed integrally of round-section tube, and since the diameter of this tube can be selected to be of sufficient size to impart any desired degree of rigidity to the construction, an equipment stand of considerable strength and stability can be provided by the present invention. In addition, as illustrated in FIG. 2C, such a stand can be designed such as to occupy a minimum of space when folded for storage. This is due to the fact that, as stated previously, the spacing between the front legs is made greater than that between the rear legs by an amount which is greater than the width of one of the casters. Thus, when the stand is folded, the casters do not come into contact but can move past each other.

It can thus be appreciated that a stand according to the present invention provides significant advantages over conventional designs of stands for supporting units of electronic equipment, in terms of increased strength and stability, freedom from movement or vibration as a result of sideways acting forces being applied, and a capability for being folded up to occupy a minimum of space when stored, in the case of a movable stand equipped with casters.

From the preceding description, it will be apparent that the objectives set forth for the present invention are effectively attained. Since various changes and modifications to the above construction may be made without departing from the spirit and scope of the present invention, it is intended that all matter contained in the above description or shown in the accompanying drawings shall be interpreted as illustrative and not in a limiting sense. The appended claims are intended to cover all of the generic and specific features of the inventiona described herein.

What is claimed is:

1. A stand for supporting items of electronic equipment, comprising:
 a front leg member including a first leg and a second leg, and a horizontal portion integrally formed with said first and second legs and having a length;
 a rear leg member including a first leg and a second leg, and a horizontal portion integrally formed with said first and second legs and having a length which is shorter than the length of said horizontal portion of said front leg member, the rear leg member being supported by the horizontal portion of said front leg member;
 first and second bracket means fixedly attached to said first leg and second leg of said rear leg member, respectively, at the upper parts of said first and second legs, each of said first and second bracket means including retaining bracket means provided at a lower side of each of said first and second bracket means to rotably retain said horizontal portion of said front leg member and prevent displacement of said horizontal portion of said front leg member along said first and second legs of said rear leg member while the first and second leg of said rear leg member lies on said horizontal portion of said front leg member to rotatably retain and support said horizontal portion of said front leg member;
 means for keeping a distance between said front leg member and said rear leg member at the lower portions of said front and rear leg members; and
 a platform member rotatably attached to said horizontal portion of said rear leg member.

2. A stand for supporting electronic equipment according to claim 1, and further comprising a first transverse member attached between the lower ends of said first and second legs of said front leg member to retain said lower ends at a predetermined spacing apart and a second transverse member attached between the lower ends of said first and second legs of said rear leg member to retain said lower ends at a predetermined spacing apart which is less than the spacing between said first and second legs of the front leg member, and wherein said distance keeping means comprises a first link member which is coupled at one end thereof to said first transverse member adjacent to said first leg of the front leg member such as to be rotatable with respect to said front leg member, a second link member which is coupled at one end thereof to said first transverse member adjacent to said second leg of said front leg member such as to be rotatable with respect to said front leg member, a third link member which is coupled at one end thereof to said second transverse member adjacent to said first leg of said rear leg member such as to be rotatable with respect to said rear leg member, and a fourth link member which is coupled at one end thereof to said second transverse member adjacent to said second leg of said rear leg member such as to be rotatable with respect to said rear leg member.

3. A stand for supporting electronic equipment according to claim 2, and further comprising a link pivot coupled at one end thereof to said first and third link members for thereby coupling said first and third link members in a mutually rotatable manner, said link pivot being further coupled at the other end thereof to said second and fourth link members for thereby coupling said second and fourth link members in a mutually rotatable manner.

4. A stand for supporting electronic equipment according to claim 1, and further comprising first and second platform mount members, each fixedly attached to said platform and rotatably supported upon said horizontal portion of said rear leg member.

5. A stand for supporting electronic equipment according to claim 4, and further comprising means for selectively retaining said first and second platform mount members in a fixedly mounted manner upon said rear leg member.

6. A stand for supporting electronic equipment according to claim 1, and further comprising casters respectively mounted at the lower end of each of said first and second legs of said front leg member and said first and second legs of said rear leg member, and wherein the distance between said first and second legs of said front leg member is greater than the distance between said first and second legs of said rear leg member by an amount which is greater than the width of one of said casters.

7. A stand for supporting electronic equipment according to claim 1, and further comprising a spacer member mounted on each of said first and second bracket means adjacent to and in contact with said front leg member, said spacer member having a contour matched to the external shape of said horizontal portion of said front leg member.

8. A stand for supporting electronic equipment according to claim 7, wherein each of said spacer members consists of a plastic material.

9. A stand for supporting electronic equipment according to claim 1, wherein each of said front and rear leg members comprises a single piece of circular cross-section tube.

10. A stand for supporting items of electronic equipment, comprising:
a front leg member comprising a first leg and a second leg, and a horizontal portion integrally formed with said first and second legs;
a rear leg member comprising a first leg and a second leg, and a horizontal portion integrally formed with said first and second legs thereof;
a first transverse member which is attached between the lower ends of said first and second legs of said front leg member such as to retain said lower ends at a predetermined spacing apart;
a second transverse member which is attached between the lower ends of said first and second legs of said rear leg member such as to retain said lower ends at a predetermined spacing apart, the latter-mentioned spacing being less than said spacing between said first and second legs of the front leg member;
a first link member which is coupled at one end thereof to said first transverse member adjacent to said first leg of the front leg member such as to be rotatable with respect to said front leg member;
a second link member which is coupled at one end thereof to said first transverse member adjacent to said second leg of said front leg member such as to be rotatable with respect to said front leg member;
a third link member which is coupled at one end thereof to said second transverse member adjacent to said first leg of said rear leg member such as to be rotatable with respect to said rear leg member;
a fourth link member which is coupled at one end thereof to said second transverse member adjacent to said second leg of said rear leg member such as to be rotatable with respect to said rear leg member;
a link pivot which is coupled at one end thereof to said first and third link members for thereby coupling said first and third link members in a mutually rotatable manner, said link pivot being further coupled at the other end thereof to said second and fourth link members for thereby coupling said second and fourth link members in a mutually rotatable manner;
first and second supporting brackets fixedly attached to said first and second legs of said rear leg member at the upper part of said first and said second leg respectively;
first and second retaining brackets fixedly attached to said first and second supporting brackets respectively, with said horizontal portion of said front leg member being rotatably retained and supported between said first supporting bracket and said first retaining bracket and also between said second supporting bracket and said second retaining bracket such that the first and second legs of said rear leg member lies on said horizontal portion of said front leg member and that said first and second supporting brackets prevents displacement of said horizontal portion of said front leg member along the legs of said rear leg member;
a platform;
first and second platform mounts, each fixedly attached to said platform and supported upon said horizontal portion of said rear leg member; and
means for selectively retaining said first and second platform mounts in a fixedly mounted manner upon said rear leg member and in a rotatable manner upon said rear leg member.

11. A stand for supporting electronic equipment according to claim 10, and further comprising casters respectively mounted at the lower end of each of said first and second legs of said front leg member and said first and second legs of said rear leg member, and wherein the spacing between said first and second legs of said front leg member is greater than the spacing between said first and second legs of said rear leg member by an amount which is greater than the width of one of said casters.

12. A stand for supporting electronic equipment according to claim 10, and further comprising a spacer member mounted on each of said first and second supporting brackets adjacent to and in contact with said front leg member, and having a contour matched to the external shape of said horizontal portion of said front leg member.

13. A stand for supporting electronic equipment according to claim 13, wherein each of said spacer members consists of a plastic material.

14. A stand for supporting electronic equipment according to claim 10, wherein each of said first and second leg members comprises a single piece of circular cross-section tube.

* * * * *